(12) United States Patent
Foerster et al.

(10) Patent No.: US 10,911,962 B2
(45) Date of Patent: Feb. 2, 2021

(54) DYNAMIC BEAM STEERING FOR VEHICLE COMMUNICATIONS

(71) Applicant: INTEL CORPORATION, Santa Clara, CA (US)

(72) Inventors: Jeffrey R. Foerster, Portland, OR (US); Zhibin Yu, Unterhaching (DE); Dave Cavalcanti, Beaverton, OR (US); Ana Lucia A. Pinheiro, Breinigsville, PA (US); Markus Dominik Mueck, Neubiberg (DE); Bernhard Raaf, Neuried (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/490,225

(22) PCT Filed: Mar. 31, 2017

(86) PCT No.: PCT/US2017/025469
§ 371 (c)(1),
(2) Date: Aug. 30, 2019

(87) PCT Pub. No.: WO2018/182706
PCT Pub. Date: Oct. 4, 2018

(65) Prior Publication Data
US 2020/0077279 A1  Mar. 5, 2020

(51) Int. Cl.
*H04W 16/28* (2009.01)
*H04W 4/40* (2018.01)
(Continued)

(52) U.S. Cl.
CPC ........ *H04W 16/28* (2013.01); *B60R 16/023* (2013.01); *G01S 7/02* (2013.01);
(Continued)

(58) Field of Classification Search
CPC ........ H04W 16/28; H04W 4/70; H04W 4/40; B60R 16/023
See application file for complete search history.

(56) References Cited

U.S. PATENT DOCUMENTS 7,021,791 B1 * 4/2006 Kobayashi ............ B60Q 1/085
362/212
9,086,481 B1  7/2015 Dowdall et al.
(Continued)

OTHER PUBLICATIONS

International Search Report for PCT Application Serial No. PCT/US2017/025469 with a completion date of Nov. 29, 2017 and dated Nov. 29, 2017, 3 pages.

*Primary Examiner* — Jinsong Hu
*Assistant Examiner* — Farideh Madani
(74) *Attorney, Agent, or Firm* — Schiff Hardin LLP (57) ABSTRACT

Communication techniques are disclosed. An example apparatus configured for communication comprises a wireless communication system and an antenna array coupled to the wireless communication system. The apparatus also includes a processor configured to nm a communication application, wherein the communication application is configured to determine an area of interest. The apparatus also includes a pattern controller to adjust a radiation pattern of the antenna array to direct wireless energy toward the area of interest.

21 Claims, 8 Drawing Sheets

(51) Int. Cl.
  *H04W 4/70* (2018.01)
  *B60R 16/023* (2006.01)
  *G01S 7/02* (2006.01)
  *G08G 1/0967* (2006.01)
  *G08G 1/16* (2006.01)
  *H01Q 1/12* (2006.01)
  *H04B 7/0408* (2017.01)
  *H04W 4/021* (2018.01)

(52) U.S. Cl.
  CPC ....... *G08G 1/096791* (2013.01); *G08G 1/163* (2013.01); *H01Q 1/125* (2013.01); *H04B 7/0408* (2013.01); *H04W 4/021* (2013.01); *H04W 4/40* (2018.02); *H04W 4/70* (2018.02)

(56) References Cited

U.S. PATENT DOCUMENTS

| | | | |
|---|---|---|---|
| 2004/0114381 A1 | 6/2004 | Salmeen et al. | |
| 2008/0258971 A1 | 10/2008 | Nichols et al. | |
| 2008/0319653 A1* | 12/2008 | Moshfeghi | G01C 21/3608 701/532 |
| 2011/0029196 A1 | 2/2011 | Escott | |
| 2013/0114964 A1* | 5/2013 | Paral | B61L 15/0036 398/115 |
| 2013/0141281 A1* | 6/2013 | Hanisch | G07B 15/063 342/374 |
| 2015/0237510 A1* | 8/2015 | Kludt | H04W 16/28 370/328 |
| 2016/0278065 A1* | 9/2016 | Kim | H04W 16/28 |
| 2017/0101056 A1* | 4/2017 | Park | B60Q 1/085 |

\* cited by examiner

DYNAMIC BEAM STEERING FOR VEHICLE COMMUNICATIONS

CROSS REFERENCE TO RELATED APPLICATIONS

Pursuant to 35 U.S.C. § 371, this application is the United States National Stage Application of International Patent Application No. PCT/US2017/025469, filed on Mar. 31, 2017, the contents of which are incorporated by reference as if set forth in their entirety herein.

TECHNICAL FIELD

The present techniques relate generally to communication systems. More specifically, the present techniques relate to dynamic beam steering in vehicle communication systems.

BACKGROUND

Vehicle-to-Everything (V2X) communication is an emerging technology that enables information passing between a vehicle to other entities within range of the vehicle, including other vehicles, roadside units, infrastructure components such as traffic lights, and others. V2X communication can be used in a wide range of applications, including automated driving, safety applications such as collision avoidance, traffic management, and others.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Various communication protocols have been developed to enable V2X communications. One such protocol is Dedicated Short-Range Communications (DSRC), which is implemented through the IEEE 802.11p standard, also known as Wireless Access for Vehicular Environments (WAVE). Cellular V2X applications, such as Long Term Evolution (LTE) V2X enable vehicular communication through cellular communications standards. Communication protocols such as DSRC, LTE V2X, 5G, Multi-Fire, WiFi, Zigbee, ZWave, and others can be used to provide various driving applications on roads through information sharing between vehicles, between devices, between road-side units and vehicles, between vehicles and infrastructure, between vehicles and personal electronic devices, etc.

Vehicular communication technologies, such as vehicle-to-vehicle (V2V) or vehicle-to-everything (V2X), enable vehicles to communicate with each other as well as with roadside infrastructure and other users of the road, including pedestrians and bicycles. This can be useful in platooning applications, cooperative driving, accident avoidance, and autonomous driving, among others. In some cases, vehicles are configured to broadcast information in an omnidirectional pattern so that everyone around them can receive the messages. However, as vehicular communications become more and more popular, the spectrum could become congested causing packet collisions and unreliability, especially in dense conditions like intersections or traffic jams. Given certain roadway configurations (e.g., divided highways), broadcasting information omnidirectionally may not be useful, and could be avoided to reduce congestion of the wireless medium. However, in some situations, omnidirectional broadcasting may be more suitable. The present disclosure describes techniques for implementing dynamic beam steering in vehicular communications. Dynamic beam steering can improve the reliability of communications, improve spectrum efficiency, and enable bandwidth sharing and coexistence.

Figure 1:
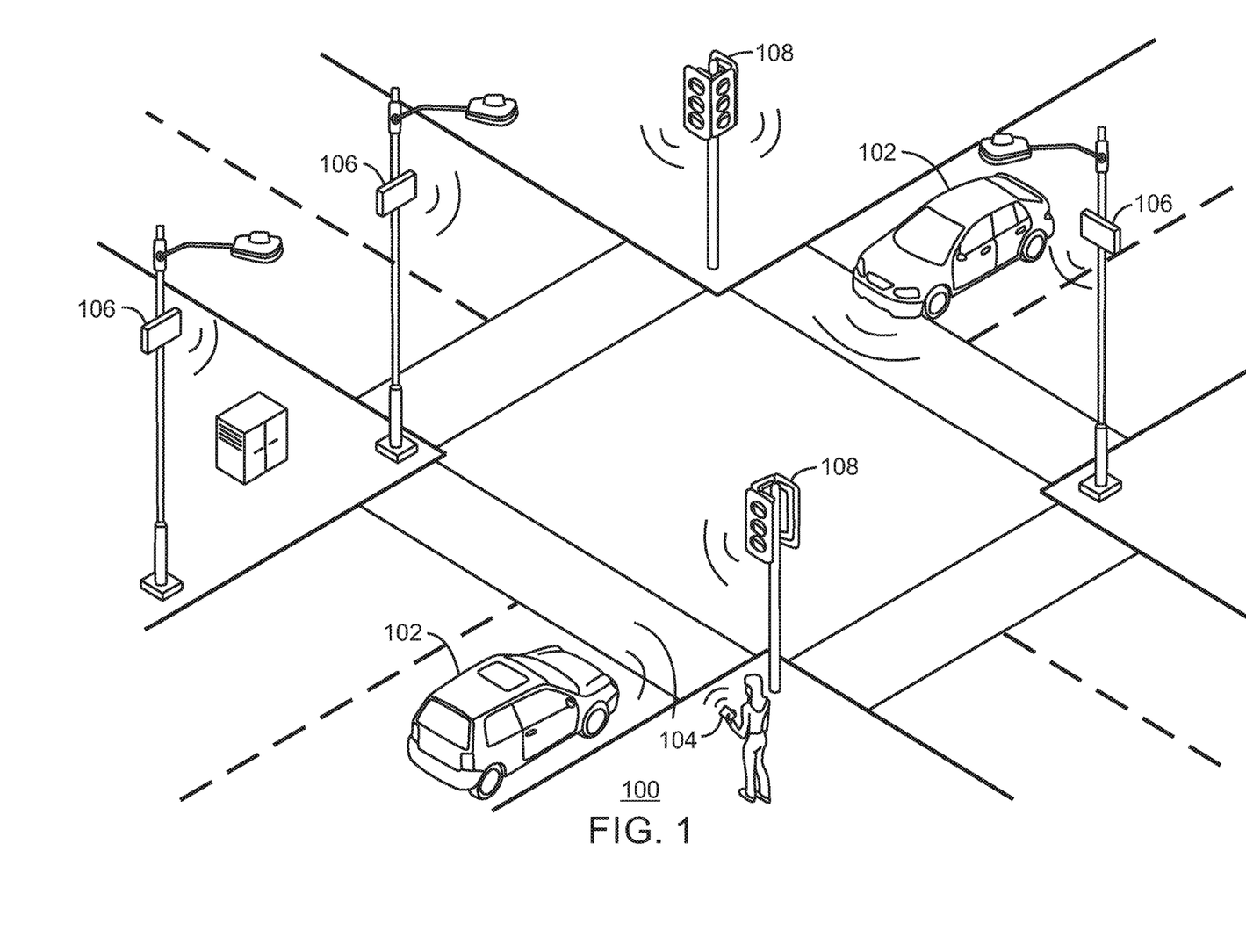
FIG. 1 illustrates a system of devices enabled for vehicular communications.

FIG. 1 illustrates a system of devices enabled for vehicular communications. The devices can include, but are not limited to, vehicles 102, user mobile devices 104, and roadside units 106. The roadside units 106 may be stand-alone devices mounted alongside a roadway and may also be incorporated in traffic lights 108, roadside lighting equipment, and others. Any of the devices may be configured to communicate with any other device within its wireless communication range to provide a range of information services. For example, vehicles 102 may exchange information to provide safety services such as cooperative adaptive cruise control, cooperative forward collision warning, intersection collision avoidance, and others. Vehicles 102 may also exchange information to enable a platooning service, which decrease the distances between vehicles and enables several vehicles to accelerate or brake simultaneously. Some of the vehicles shown in FIG. 1 may be autonomous driving vehicles. The vehicles 102 and other devices may be use any suitable vehicular communication protocol, including WAVE DSRC, LTE V2X, and others. In the context of the present disclosure, vehicles and devices may be used interchangeably without departing the spirit and scope of the present disclosure.

Vehicles 102 may also exchange information with roadside units 106. A variety of services may be provided by the roadside units 106, depending on their configuration and capabilities. For example, roadside units 106 may collect position and speed information from vehicles 102, which may be used to generate statistical data about the traffic on specific roadways. Traffic information may then be sent back to vehicles 102 to inform drivers about the traffic flow for certain roadways and alert drivers about traffic related events, such as traffic jams, construction projects, traffic accidents, and the like. Some roadside units 106 may be configured to collect tolls or parking payments from motorists. Some roadside units 106 may also be configured to provide weather alerts to vehicles. A wide variety of additional information exchange is also possible.

Vehicles 102 may also exchange information with roadside units coupled to traffic lights 108. For example, traffic lights 108 may send information to vehicles 102 to warn motorists about upcoming light changes. Traffic lights 108 may also receive information from vehicles 102. The numbers of approaching vehicles at various intersection approaches may be used to help determine light changes to provide a smoother flow of traffic over the roadways. Traffic lights 108 may also receive information from pedestrians through mobile electronic devices 104 such as smart phones, smart watches, bracelets, tablet computers, and the like. The number of pedestrians at a crosswalk can be taken into account for determining light changes. Traffic lights 108 can also exchange information with each other to coordinate light changes. Mobile electronic devices 104 may also be configured to exchange messages with vehicles 102. For example, a mobile electronic device 104 may be configured to transmit position information to vehicles, which the vehicles 102 may use to avoid colliding with the owner or wearer of the mobile electronic device 104.

In some embodiments, some of the devices may be able to couple to a Wide Area Network (WAN) through various access points. For example, the roadside units 106 may be communicatively coupled to a WAN through a cellular communication standard, such as 4G, 5G, Long Term Evolution (LTE), or a WiFI wireless access point, for example. The connection to the WAN may enable the roadside units 106 to access a central management facility, such as a traffic management facility, toll collection facility, and others. The connection to the wide area network may enable the roadside units 106 to facilitate exchanges of information between the vehicles and servers connected to the wide area network.

In some cases, the onboard antenna system of a vehicle may have a fixed, predetermined radiation pattern, which may be optimized for broadcasting data in all directions. However, depending on the particular situation, a particular vehicle may have no need to broadcast data in all directions or receive data from all directions. For example, a vehicle that is part of a platoon may only need to communication with the vehicles directly behind it or in front of it. In such situations, it may be desirable to transmit and receive data within a narrower field of view. This can improve spectral efficiency and sharing of the spectrum by directing the energy only in the direction needed so that others users can spatially reuse the available spectrum. In some situations, it may also be desirable to broadcast information in all directions. The some vehicles may be configured to detect scenarios in which omni directionality is desirable and scenarios in which beam steering can be activated. Furthermore, the vehicles 102 and roadside units 106 may be configured to identify one or more areas of interest and can change the radiation pattern of the device's antenna array to focus the wireless energy toward the area or areas of interest. This could be done based on information about roadway configurations (e.g. maps), real time traffic, detection of objects in the surrounding environment, and others.

Figure 2:
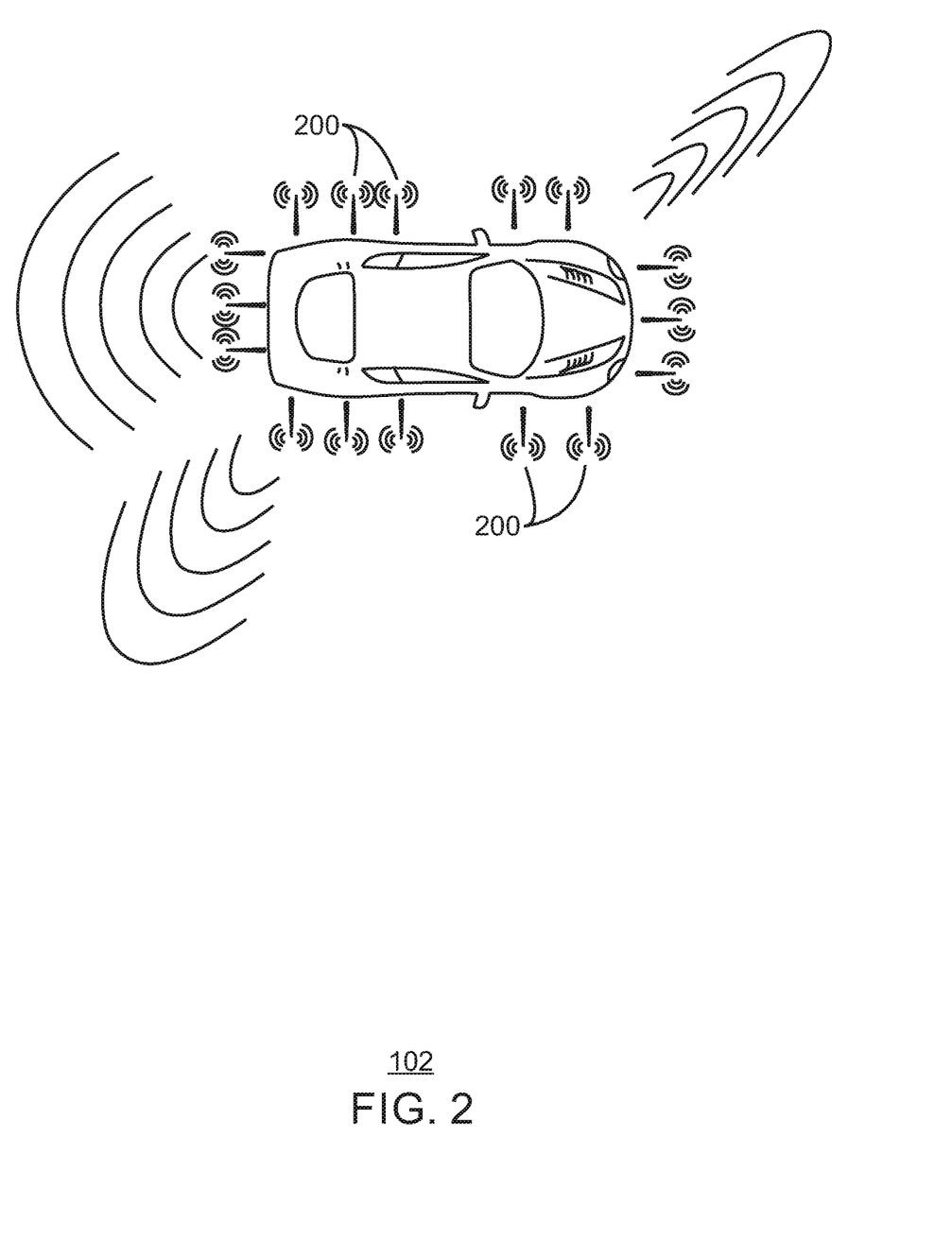
FIG. 2 is an illustration of a vehicle equipped with dynamic beam steering.

FIG. 2 is an illustration of a vehicle equipped with dynamic beam steering. As shown in FIG. 2, the vehicle 102 includes a plurality of antennas 200 forming an antenna array. The antennas 200 are distributed around the vehicle 102 to ensure full coverage of the spatial environment. It will be appreciated the symbols used in FIG. 2 to represent the antennas 200 are for explanatory purposes. In an actual embodiment, the antennas 200 may be integrated into the form factor of the car so as to be concealed or visible but unobtrusive. Furthermore, the number of antennas 200 and their placement on the vehicle 102 may be determined based on the design considerations of a particular embodiment.

The antennas 200 form an antenna array that can be controlled to direct the energy of the transmissions in a desired direction or multiple desired directions corresponding with one or more areas of interest. Any suitable radiation pattern can be generated based on the desired beam angles, the desired beam widths, and the like. The antenna array can also be controlled to form multiple beams with varying beam widths. In some embodiments, the antennas may be grouped to form separate antenna arrays that communicate on separate channels. Any antenna may be grouped with any other antenna or set of antennas, and the groupings may be reconfigured dynamically based on current needs.

The antennas 200 are centrally controlled by electronics in the vehicle 102 to appropriately set the antenna gains and phases to provide the desired directionality of the beams. In order to achieve antenna beamforming, each RF radio unit associated with each antenna may be time synchronized using a clock included in or associated with the central controller. The synchronization can be achieved either through a wired connection or wireless connection between RF radio unit and the central controller.

The desired radiation pattern of the antenna array may be determined in a variety of ways. The desired radiation pattern may be determined based on the particular vehicular communication application and awareness of the vehicle's actions. In some embodiments, the vehicle may be configured to transmit information regarding driver or vehicle actions, such as whether the vehicle is braking. Such information may be useful in autonomous driving and collision avoidance applications. The desired radiation pattern may be selected to transmit the driver or vehicle action information to other vehicles that may be more likely to be effected while excluding vehicles that are unaffected. For example, if the breaks are being applied, the desired radiation pattern may be a single beam directed toward the rear of the vehicle 102. If the driver of the vehicle is changing lanes, the desired radiation pattern may be a single beam angled toward the rear of the vehicle and in the direction of the lane that the vehicle is moving to.

In some embodiments, the desired radiation pattern may be based on information received about the vehicles surrounding environment. The vehicle may be equipped with sensors and systems that enable it to identify objects in the surrounding environment. For example, the vehicle may include video cameras, laser range finding system, radar, and others. These systems may be used to locate and identify other vehicles, pedestrians, bicycles, etc. that may benefit from the information from the vehicle. If this information is available, the desired radiation pattern may be a narrow beam aimed directly to the location where the information is intended to be received.

In some embodiments, the desired radiation pattern may be based on roadway configurations gathered from map data. For example, if it is determined that vehicle is travelling on a divided highway, the desired radiation pattern may be a narrow beam aimed toward the front and back of the vehicle. This enables the vehicle to restrict communication to other vehicles that are traveling in the same direction and in the same lane.

To support vehicle navigation systems or autonomous driving, the vehicle may be equipped with positioning technologies such as the Global Positioning System (GPS) or other type of global navigation satellite system (GNSS) such as Galileo. The location information may be used to determine the desired radiation pattern. For example, due to regulatory compliance or safety regulations, omnidirectional transmissions could be required in certain areas, such as near intersections or on undivided two way roads. The location information could be used to switch between a beam steering mode and an omnidirectional mode.

The desired radiation pattern may be also based on information received from other vehicles or other devices enabled for vehicular communication. Position information may be shared between vehicles using a vehicular communication protocol such as the WAVE/DSRC protocol. For example, position information may be included in Basic Safety Messages (BSMs), which are defined by the WAVE/DSRC protocol and are transmitted once every 100 milliseconds with nearby vehicles. Position information received from other vehicles or roadside units can be used to determine the desired radiation pattern so that energy is directed toward the indicated positions.

Figure 3:
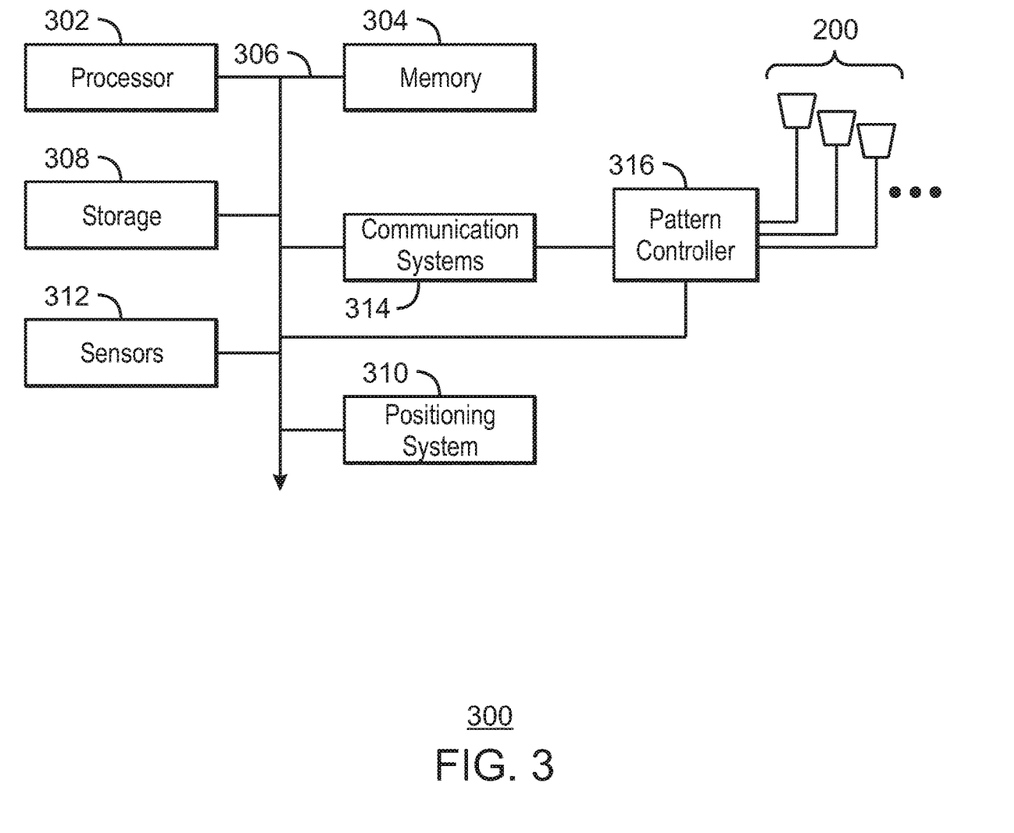
FIG. 3 is a block diagram of an exemplary system of components that may be used for dynamic beam steering in vehicular communications.

FIG. 3 is a block diagram of an example system of components that may be used for dynamic beam steering in vehicular communications. The system 300 may be included in the vehicle 102 described in relation to FIGS. 1 and 2, the roadside units 106 and traffic lights 108 described in relation to FIG. 1, among others. The system 300 may be also included in personal mobile electronic devices 104 such as mobile phones, wearable devices such smart watches, bracelets, and others. The components may be implemented as ICs, portions thereof, discrete electronic devices, or other modules, logic, hardware, software, firmware, or a combination thereof adapted in the device, or as components otherwise incorporated within a chassis of a larger device. The block diagram of FIG. 3 is intended to show a high level view of components of the system 300. However, some of the components shown may be omitted, additional components may be present, and different arrangement of the components shown may occur in other implementations.

The system 300 may include a processor 302, which may be a microprocessor, a multi-core processor, a multithreaded processor, an ultra-low voltage processor, an embedded processor, or other known processing element. The processor 302 may be a part of a system on a chip (SoC) in which the processor 302 and other components are formed into a single integrated circuit, or a single package, such as the Edison™ or Galileo™ SoC boards from Intel. As an example, the processor 302 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5, A9, or similar, processor from Apple® Inc., a Snapdragon™ processor from Qualcomm® Technologies, Inc., or an OMAP™ processor from Texas Instruments, Inc.

The processor 302 may communicate with a system memory 304 over a bus 306. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, drivers, operating systems, and so forth, a mass storage 308 may also couple to the processor 302 via the bus 306. The mass storage 308 may be implemented via any type of non-transitory, machine-readable medium, such as a solid state disk drive (SSDD), a hard drive, an array of hard drives, an optical disk, a thumb drive, and the like. In some examples, the mass storage 308 may be implemented using a micro hard disk drive (HDD). Further, any number of new technologies may be used for the mass storage 308 in addition to, or instead of, the technologies described, such resistance change memories, phase change memories, holographic memories, or chemical memories, among others. For example, the system 300 may incorporate the 3D XPOINT memories from Intel® and Micron®.

The components may communicate over the bus 306. The bus 306 may include any number of technologies, including industry standard architecture (ISA), extended ISA (EISA), peripheral component interconnect (PCI), peripheral component interconnect extended (PCIx), PCI express (PCIe), or any number of other technologies. The bus 306 may be a proprietary bus, for example, used in a SoC based system. Other bus systems may be included, such as an I$^2$C interface, an SPI interface, and point to point interfaces, among others.

The bus 306 may couple the processor 302 to a positioning system 310, such as Global Positioning System (GPS), Galileo, and others. The positioning system may also include a local positioning system that relies on WiFi access points, cellular base stations, and the like.

In some embodiments, the bus 306 may couple the processor 302 to one or more sensors 312 for sensing the surrounding environment and/or sensing vehicle systems. For example, the sensors 312 may include proximity sensors, video cameras, laser range finding systems, radar, and others. The sensors 312 may also include sensors for detecting vehicle controls, such as vehicle speed, whether the vehicles is breaking, and the like.

The bus 306 may couple the processor 302 to a wireless communication system 314, for communication with other devices, including other vehicles, roadside units, and the like. The wireless communication system 314 may provide one or multiple radio links. The wireless communication system 314 may be configured in accordance with any suitable V2V or V2X communication protocol, such as LTE V2X, WAVE DSRC, also known as IEEE 802.11p, and others. For example, any of the radio links may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

The techniques described herein can also be used in the context of any spectrum management scheme including dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable spectrum bands may include International Mobile Telecommunications (IMT) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the Intelligent Transport Systems (ITS) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) including the 400 MHz and 700 MHz bands. Besides cellular applications, specific applications for vertical markets may be addressed such as PMSE (Program Making and Special Events), medical, health, surgery, automotive, low-latency, drones, etc. applications. The techniques described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. In some examples, access to the spectrum may be prioritized for different types of users (e.g., low/medium/high priority, etc.), based on a prioritized access to the spectrum e.g. with highest priority to tier-1 users, followed by tier-2, then tier-3 users, etc.

The bus 306 may couple the processor 302 to a pattern controller 316 that controls the radiation pattern of the antenna array 200. The pattern controller 316 controls the radiation pattern by controlling the relative amplitude and phase of the signals sent or received by each of the antennas 200. The relative amplitude and phase applied to the antenna signals may be referred to herein as the pattern control parameters. Each pattern control parameter may be a complex gain corresponding to a particular one of the antenna signal inputs or outputs. The pattern control parameters may be varied during operation to adapt the antenna pattern to changing conditions. The pattern controller 316 may also be configured to time synchronize each RF radio unit associated with each antenna of the antenna array 200.

The mass storage 308 can store one of more V2V or V2X applications, including safety applications, information service applications, autonomous driving applications, and platooning applications, among others. The V2V or V2X application may be configured to send pattern control instructions to the pattern controller 316 for setting the radiation pattern of the antenna array 200. The pattern control instructions may be determined based on information received through the sensors 312, the positioning system 310, and position information received from remote devices such as other vehicles, among others.

It is to be understood that the block diagram of FIG. 3 is not intended to indicate that the system 300 is to include all of the components shown in FIG. 3. Rather, the system 300 can include fewer or additional components not illustrated in FIG. 3. Furthermore, the components may be coupled to one another according to any suitable system architecture, including the system architecture shown in FIG. 3 or any other suitable system architecture that enables the antennas 200 to be controlled for dynamic beam forming. Some examples of beam steering techniques are described further in relation to FIGS. 4-8

Figure 4:
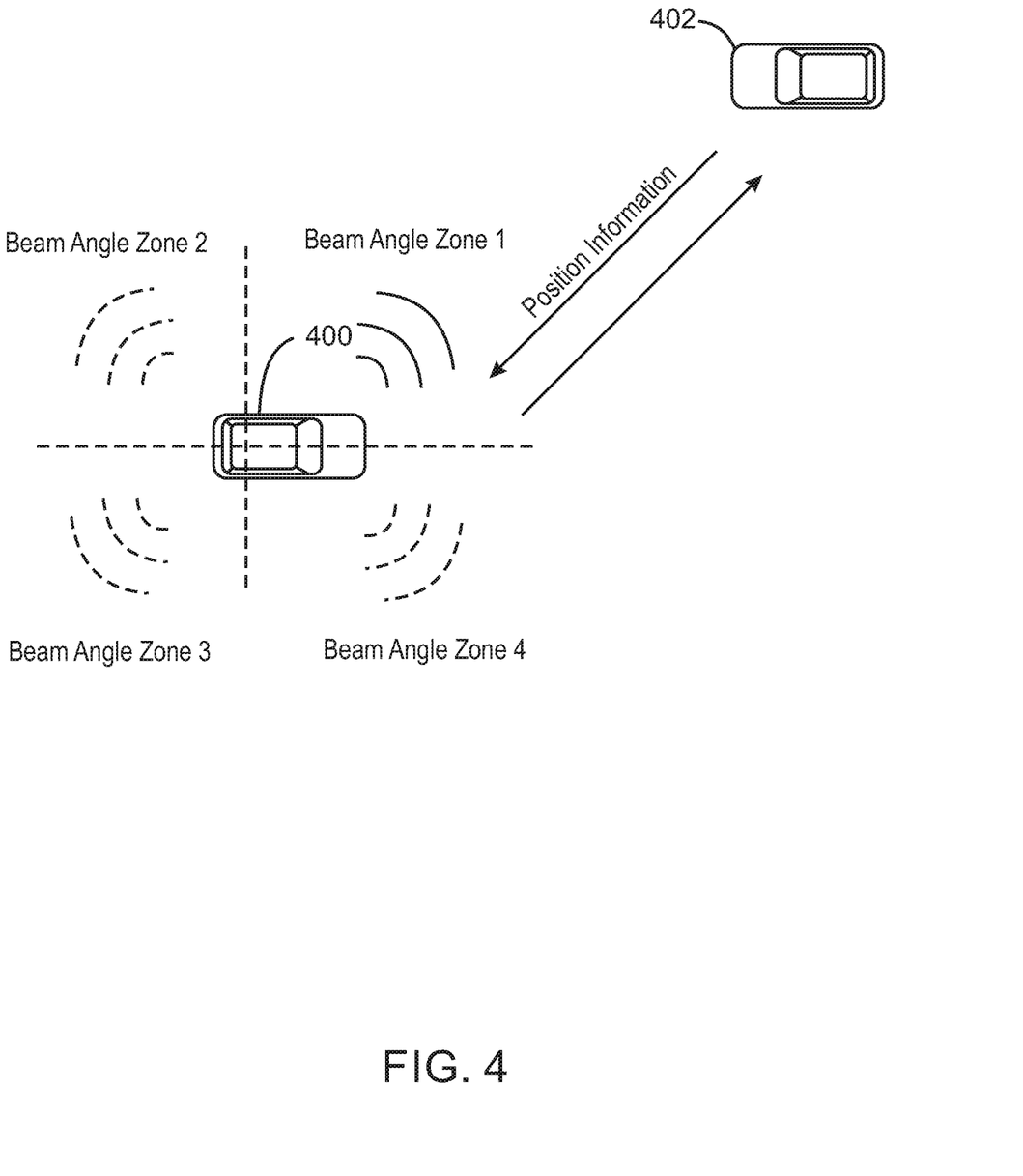
FIG. 4 is an illustration of a first example beam steering implementation.

FIG. 4 is an illustration of an example beam steering implementation. FIG. 4 shows an example involving two vehicles 400 and 402 configured for V2V communication. In this example, the antenna system of vehicle 400 can be dynamically adjusted to selectively direct the wireless energy into four different zones, numbered 1 to 4. Each zone may be activated separately or two or more zones may be activated simultaneously. For omnidirectional communication, all four zones may be activated. It will be appreciated that the zone configuration shown in FIG. 4 is just one example of a possible zone configuration. In other embodiments of the present techniques, the area around the car can be divided into fewer or additional zones and the zones may be oriented differently from what is shown in FIG. 4.

Vehicles 400 and 402 are able to exchange messages for a variety of purposes such as platooning, collision avoidance, autonomous driving, and others. Additionally, vehicle 400 is able to determine a position of vehicle 402 and adjust the radiation pattern of its antenna system accordingly. The location of vehicle 402 may be determined by processing information received from vehicle 402. For example, the vehicle 402 may send position information to vehicle 400 such as map coordinates. Based on the location of vehicle 402 in comparison to its own location, vehicle 400 activates the zone with the most suitable beam angle. In the example shown in FIG. 4, zone 1 is activated and zones 2-4 are deactivated, resulting in approximately 6 decibel signal gain.

In addition to location, vehicle speed and direction could also be used as the information for dynamically beam tracking. The vehicle speed and direction information may be passed from vehicle 402 to vehicle 400. The location, speed, and direction of vehicle 402 can be processed by vehicle 400 to dynamically adjust the beam direction by run-time predicting the new locations of the vehicle 402. For example, vehicle 400 may predict that vehicle 402 will pass into zone 2, at which time, vehicle 400 can deactivate zone 1 and activate zone 2.

Figure 5:
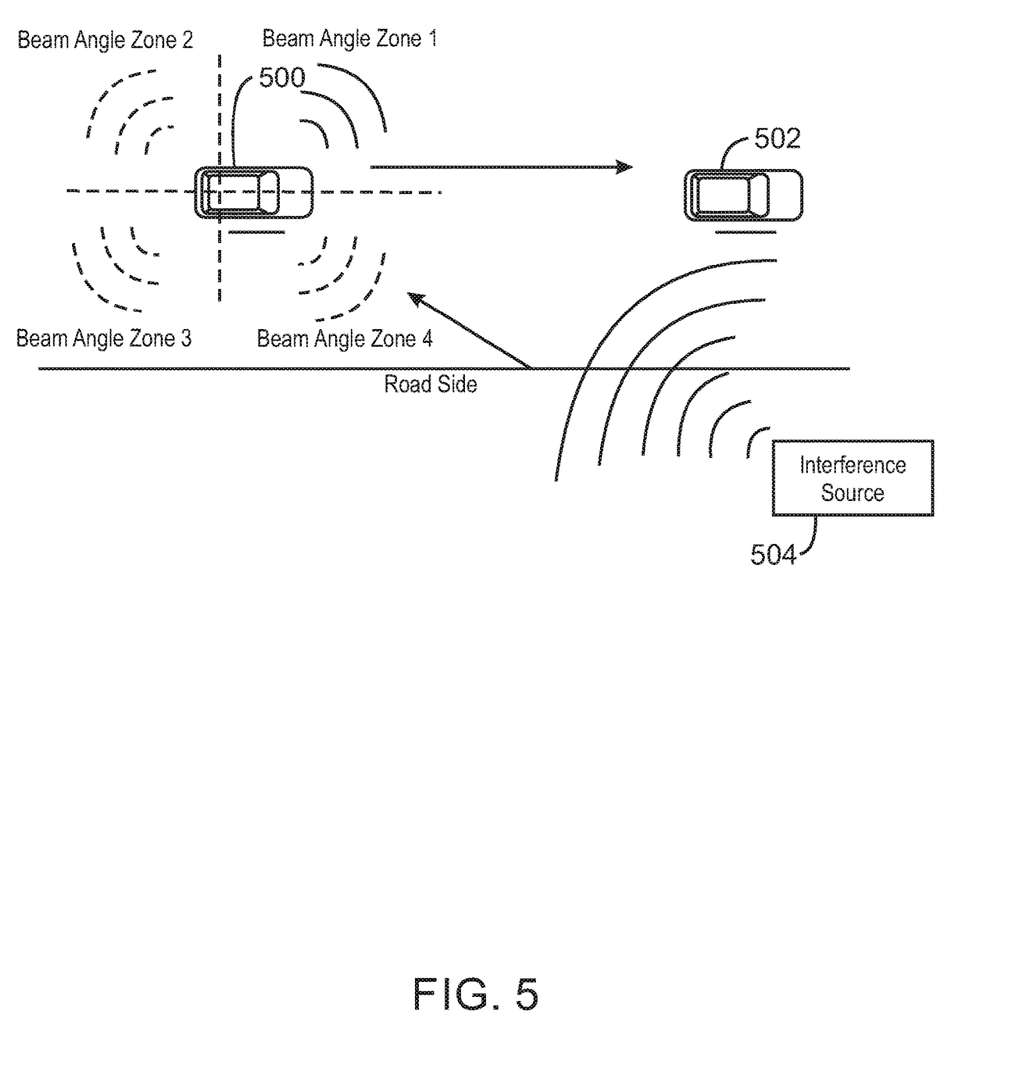
FIG. 5 is an illustration of a second example beam steering implementation.

FIG. 5 is an illustration of another example beam steering implementation. FIG. 5 shows an example involving two vehicles 500 and 502 configured for vehicle-to-vehicle communication. As with vehicle 402 FIG. 4, the antenna system of vehicle 502 can be dynamically adjusted to selectively direct the wireless energy into four different zones, numbered 1 to 4. Other zone configurations are also possible.

In this example, vehicles 500 and 502 are travelling in the same direction on the same road. The vehicles are in wireless communication with each other for the purpose of platooning or other V2V services. Also shown in FIG. 5 is an interference source 504. The interference source may be any type of device with a radio transmitter, including another vehicle, a hand-held mobile device, a roadside unit, a cell tower, and others. The interference may be random noise which can reduce the Signal-to-Noise Ratio (SNR) of the incoming signals received from vehicle 502. In some cases, the interference source may be generated by malicious software attempting to hack into with the vehicle's systems through the vehicular communication system.

The vehicle 500 can detect the angle of the incoming interference signal and change the radiation pattern of the antenna array to spatially filter out the interference signal. For example, prior to detecting the interference signal, the vehicle 500 may have activated zone 1 and zone 4 for communication with vehicle 502, which is directly in front of it. Upon detecting the interference signal in zone 4, zone 4 was deactivated, and the transmission energy is now directed to zone 1 only. Deactivating zone 4 may reduce the signal gain of the desired signal received from vehicle 502. However, the signal gain for the interfering signal will be even more greatly reduced. This can help to improve communication with the vehicle 502 and limit the ability of unwanted transmissions to consume bandwidth or cause security risks.

Figure 6:
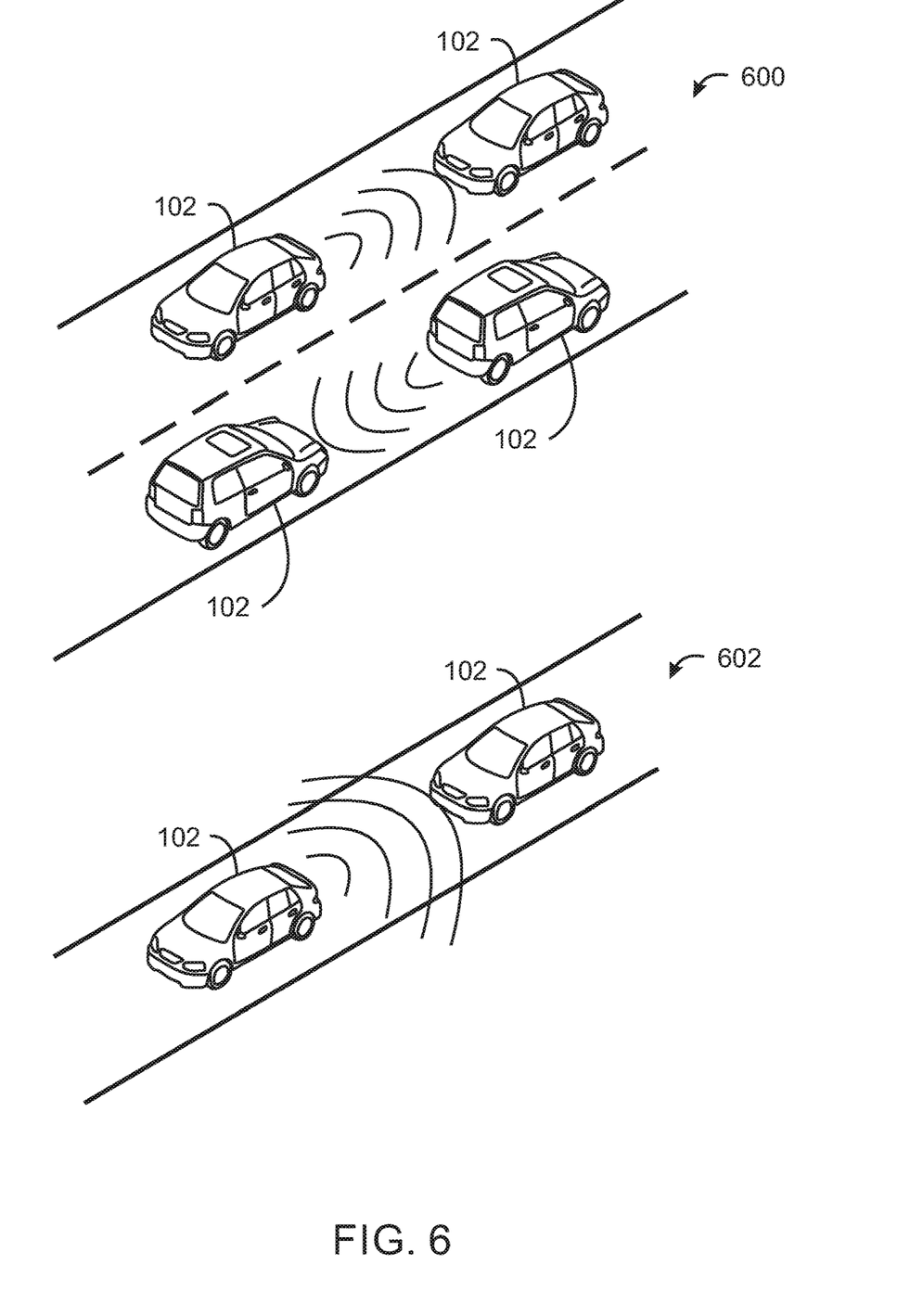
FIG. 6 is an illustration of a third example beam steering implementation.

FIG. 6 is an illustration of another example beam steering implementation. Specifically, FIG. 6 shows an example in which beam steering is used to change the directivity of the antenna array based on the type of roadway that a vehicle is travelling on. The level of directivity of the beam may be adapted to reduce interference potentially caused to neighboring systems. For example, FIG. 6 shows two different types of roadways, bidirectional roadway 600 and a more isolated single-direction roadway 602. The bidirectional roadway 600 has two lanes for traveling in opposite directions with little or no separation between the opposing lanes. Accordingly, it can be expected that vehicles traveling in opposite directions will be relatively close to one another. However, each vehicle may be configured for communication only with those vehicles traveling together in the same direction. Accordingly, the directivity of each vehicle's antenna array may be increased to provide a narrow beam width such that little or no interference will occur to cars moving into the opposite direction and equipped with the same vehicular communications technology.

By contrast, roadway 602 is more isolated. For example, the roadway 600 may be a one-way road with a wide separation distance from any roadways traveling in the opposite direction. Accordingly, it can be expected that there will be a wide separation distance from vehicles traveling in the opposite direction. In this situation, the directivity of each vehicle's antenna array may be decreased to provide a wider beam width with little or no risk of interference with cars moving into the opposite direction.

The directionality of the antenna array may be determined by comparing the vehicles own geographical position to road map information. Other factors for controlling directionality can include regulatory rules such as city ordinances, other safety regulations or policies, traffic conditions, time of day, and others.

Figure 7:
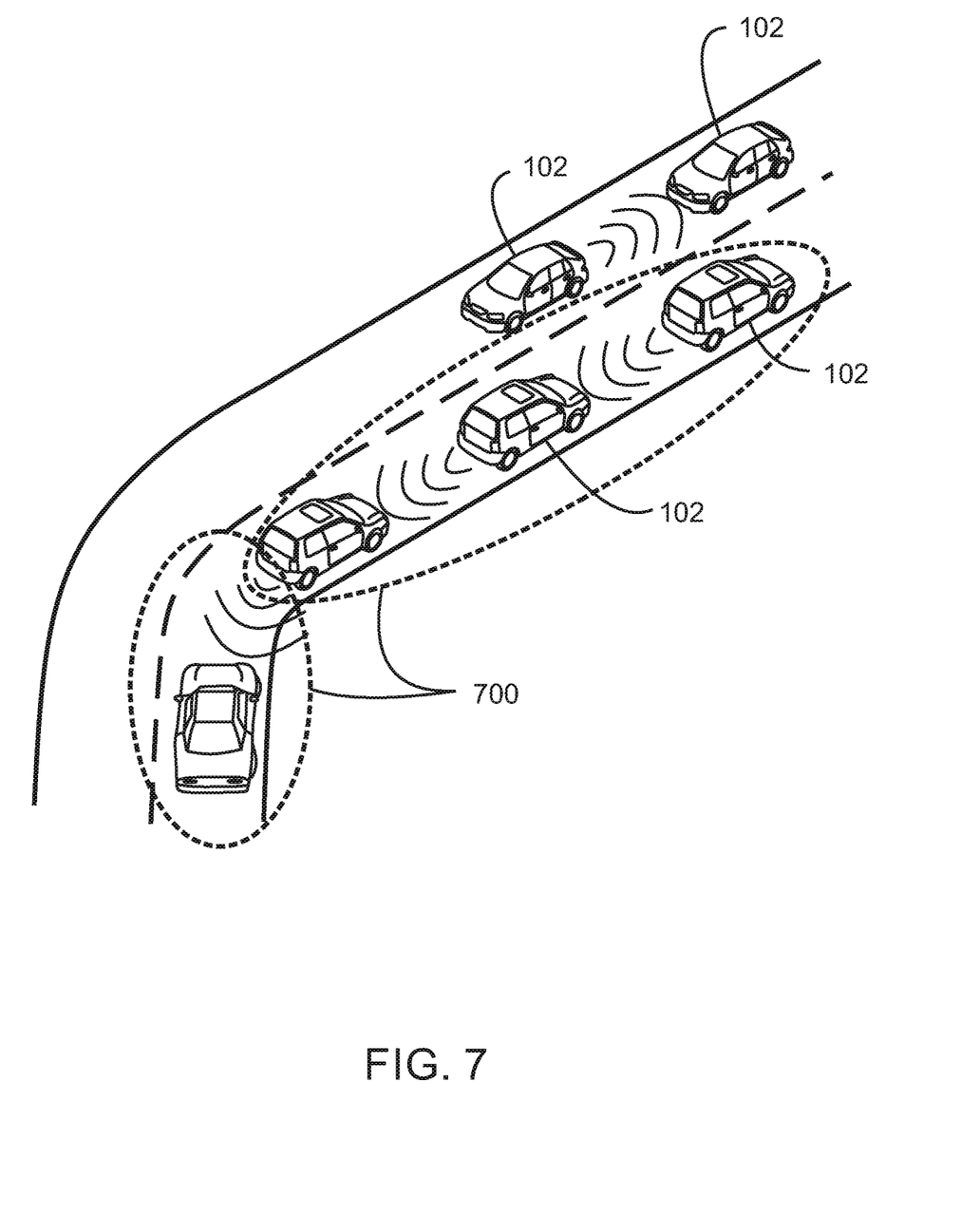
FIG. 7 is an illustration of a fourth example beam steering implementation.

FIG. 7 is an illustration of another example beam steering implementation. Specifically, FIG. 7 shows an example in which beam steering is used to change the beam angle of the antenna array based on the movement of vehicles in a platoon 700. In this example, the vehicles 102 in the platoon 700 are configured to adapt the beam angle of their antenna array in order to communicate with other vehicles 102 in the platoon 700 while spatially filtering out those vehicles not in the platoon 700. The signal transmissions may be used for data communication between the vehicles 102. Additionally, the signal transmissions may be used for determining a distance between vehicles 102, for example, using time-of-flight calculations.

As the relative positions of the vehicles 102 change, the beam angle of the antenna array is adjusted accordingly. For example, as shown in FIG. 7, the vehicles 102 in the platoon 700 may encounter a bend in the road. As each vehicle 102 goes around the bend, the beam angle is adjusted to maintain the transmission energy aimed at the other members of the platoon 700. Similar adjustments to the beam angle may be made during lane changes or other changes in road conditions.

In order to properly adjust the beam angle, each vehicle is configured to track the intended movements of neighboring vehicles 102 in the platoon 700. In some embodiments, the intended movements may be communicated among the neighboring vehicles through the signal transmissions. In some embodiments, the intended movements of neighboring vehicles may be determined by comparing the vehicle's position, speed, and direction with road map information. Other techniques for determining the intended movements of neighboring vehicles in a platoon are also possible.

Figure 8:
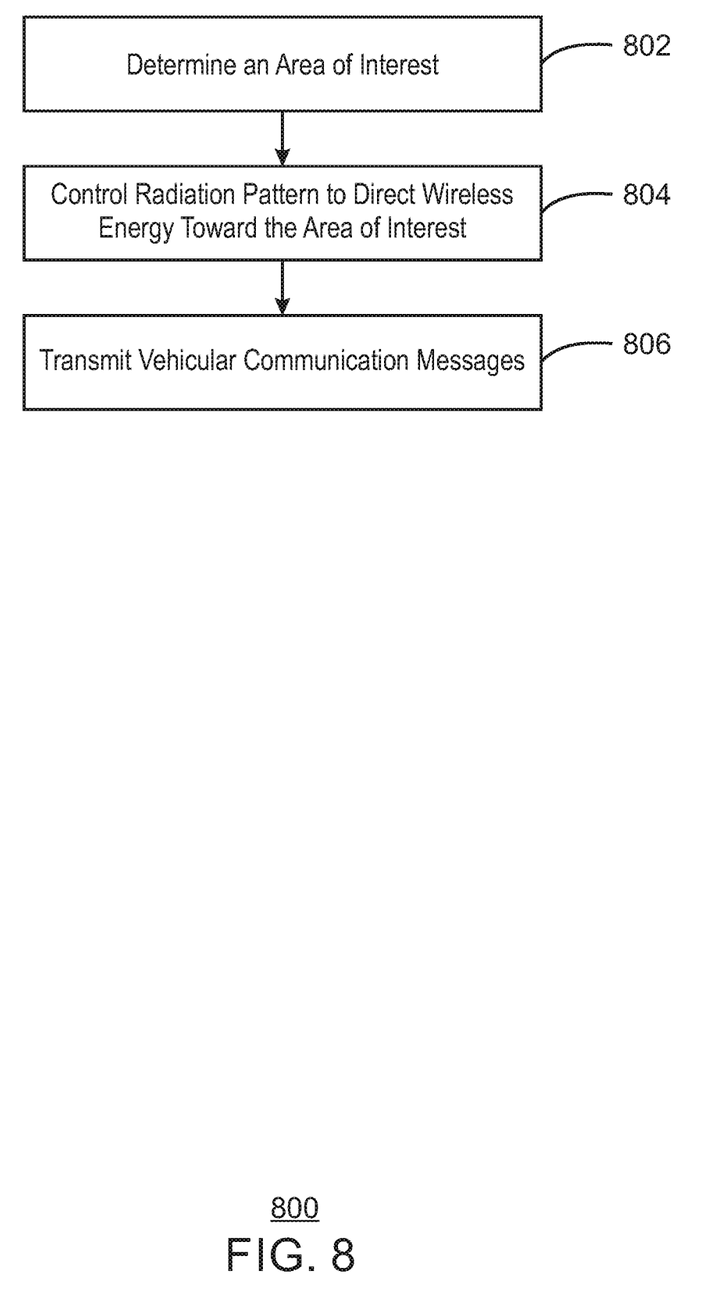
FIG. 8 is a simplified process flow diagram summarizing a method of providing vehicular communication messages.

FIG. 8 is a simplified process flow diagram summarizing a method of providing vehicular communication messages. The method 800 may be implemented by the system 300 described in FIG. 3, which may be implemented in a vehicle, or stationary device such as roadside unit. The method 800 may begin at block 802.

At block 802, and area of interest for transmitting the vehicular communication messages is determined. The area of interest is an area that is known or expected to include other devices (e.g., vehicles) that the communications should be directed to. The area of interest may be determined based on position information received from a vehicle through the wireless communication system 314. The area of interest may also be determined based on the location of the device performing the method and the surrounding environment. For example, the area of interest may be determined by comparing the device's geographical position with a roadway configuration identified from map data, and/or detecting objects in the surrounding environment through sensors. In some embodiments, the area of interest is a predicted position of a vehicle, wherein the predicted position may be based on location, speed, and direction information received from the vehicle.

At block 804, the radiation pattern of the antenna array is controlled to direct wireless energy toward the area of interest. Changing the radiation pattern may include changing the beam width, beam angle, the number of beams, making the radiation pattern omnidirectional, changing the grouping of antennas within the antenna array, and others.

At block 806, vehicular communication messages are transmitted through a wireless communication system coupled to the antenna array. The messages may be transmitted in accordance with any suitable V2V or V2X communication protocol, including LTE V2X, WAVE/DSRC, also known as IEEE 802.11p, and others. The content of the messages may include vehicle safety information, such as collision avoidance information, autonomous driving information, platooning information, and others. The messages may also include the information used to determine the area of interest such as vehicle position information and the like. The process flow may then return to block 802, and the method may be repeated.

The method 800 should not be interpreted as meaning that the blocks are necessarily performed in the order shown. Furthermore, fewer or greater actions can be included in the method 800 depending on the design considerations of a particular implementation.

EXAMPLES

Example 1 is an apparatus for vehicular communications. The apparatus includes a wireless communication system; an antenna array coupled to the wireless communication system; a processor configured to run a vehicular communication application. The vehicular communication application is configured to determine an area of interest. The apparatus also includes a pattern controller to adjust a radiation pattern of the antenna array to direct wireless energy toward the area of interest.

Example 2 includes the apparatus of example 1. In this example, the apparatus is deployed in a vehicle and the area of interest is determined based on objects detected in the vehicle's surrounding environment.

Example 3 includes the apparatus of any one of examples 1 to 2. In this example, the area of interest is determined based on position information received from a vehicle through the wireless communication system.

Example 4 includes the apparatus of any one of examples 1 to 3. In this example, the area of interest is determined based on a comparison of a geographical position of the apparatus with a roadway configuration identified from map data.

Example 5 includes the apparatus of any one of examples 1 to 4. In this example, the vehicular communication application is configured to identify an interference source and instruct the pattern controller to adjust the radiation pattern of the antenna array to direct wireless energy away from the interference source.

Example 6 includes the apparatus of any one of examples 1 to 5. In this example, the apparatus is deployed in a vehicle and wherein to adjust the radiation pattern of the antenna array includes increasing a directivity of the antenna array when the vehicle is traveling on a bidirectional roadway.

Example 7 includes the apparatus of any one of examples 1 to 6. In this example, the apparatus is deployed in a first vehicle and wherein to adjust the radiation pattern of the antenna array includes to adjust a beam angle of the antenna array to direct the wireless energy to a second vehicle as a relative position between the first vehicle and the second vehicle changes.

Example 8 includes the apparatus of any one of examples 1 to 7. In this example, the apparatus is deployed in a roadside unit.

Example 9 includes the apparatus of any one of examples 1 to 8. In this example, the area of interest is based on a predicted position of a vehicle, wherein the predicted position is based on location, speed, and direction information received from the vehicle.

Example 10 includes the apparatus of any one of examples 1 to 9. In this example, the wireless communication system is a Dedicated Short-Range Communications (DSRC) system.

Example 11 is a non-transitory, computer-readable medium including instructions that, when executed by a processor, direct the processor to transmit vehicular communication messages. The computer-readable medium includes instructions that direct the processor to transmit vehicular communication messages through a wireless communication system coupled to an antenna array; determine an area of interest for transmitting the vehicular communication messages; and control a radiation pattern of the antenna array to direct wireless energy toward the area of interest.

Example 12 includes the computer-readable medium of example 11. In this example, the computer-readable medium is deployed in a vehicle and the area of interest is determined based on objects detected in the vehicle's surrounding environment.

Example 13 includes the computer-readable medium of any one of examples 11 to 12. In this example, the area of interest is determined based on position information received from a vehicle through the wireless communication system.

Example 14 includes the computer-readable medium of any one of examples 11 to 13. In this example, the area of interest is determined based on a comparison of a geographical position with a roadway configuration identified from map data.

Example 15 includes the computer-readable medium of any one of examples 11 to 14. In this example, the computer-readable medium includes instructions to identify an interference source and control the radiation pattern of the antenna array to direct wireless energy away from the interference source.

Example 16 includes the computer-readable medium of any one of examples 11 to 15. In this example, the computer-readable medium is deployed in a vehicle and to control the radiation pattern of the antenna array includes increasing a directivity of the antenna array when the vehicle is traveling on a bidirectional roadway.

Example 17 includes the computer-readable medium of any one of examples 11 to 16. In this example, the computer-readable medium is deployed in a first vehicle and to adjust the radiation pattern of the antenna array includes to adjust a beam angle of the antenna array to direct the wireless energy to a second vehicle as a relative position between the first vehicle and the second vehicle changes.

Example 18 includes the computer-readable medium of any one of examples 11 to 17. In this example, the computer-readable medium is deployed in a roadside unit.

Example 19 includes the computer-readable medium of any one of examples 11 to 18. In this example, the area of interest is based on a predicted position of a vehicle, wherein the predicted position is based on location, speed, and direction information received from the vehicle.

Example 20 includes the computer-readable medium of any one of examples 11 to 19. In this example, the wireless communication system is a Dedicated Short-Range Communications (DSRC) system.

Example 21 is a method of performing vehicular communications. The method includes transmitting vehicular communication messages through a wireless communication system coupled to an antenna array; determining an area of interest for transmitting the vehicular communication messages; and controlling a radiation pattern of the antenna array to direct wireless energy toward the area of interest.

Example 22 includes the method of example 21. In this example, determining the area of interest is based on objects detected in a vehicle's surrounding environment.

Example 23 includes the method of any one of examples 21 to 22. In this example, determining the area of interest is based on position information received from a vehicle through the wireless communication system.

Example 24 includes the method of any one of examples 21 to 23. In this example, determining the area of interest is based on a comparison of a geographical position with a roadway configuration identified from map data.

Example 25 includes the method of any one of examples 21 to 24. In this example, the method includes identifying an interference source and controlling the radiation pattern of the antenna array to direct wireless energy away from the interference source.

Example 26 includes the method of any one of examples 21 to 25. In this example, the wireless communication system and antenna array are deployed in a vehicle, and wherein controlling the radiation pattern of the antenna array includes increasing a directivity of the antenna array when the vehicle is traveling on a bidirectional roadway.

Example 27 includes the method of any one of examples 21 to 26. In this example, the wireless communication system and antenna array are deployed in a first vehicle and adjusting the radiation pattern of the antenna array includes adjusting a beam angle of the antenna array to direct the wireless energy to a second vehicle as a relative position between the first vehicle and the second vehicle changes.

Example 28 includes the method of any one of examples 21 to 27. In this example, the wireless communication system and antenna array are deployed in a roadside unit.

Example 29 includes the method of any one of examples 21 to 28. In this example, the area of interest is based on a predicted position of a vehicle, wherein the predicted position is based on location, speed, and direction information received from the vehicle.

Example 30 includes the method of any one of examples 21 to 29. In this example, the wireless communication system is a Dedicated Short-Range Communications (DSRC) system.

Example 31 is an apparatus for vehicular communications. The apparatus includes means for transmitting vehicular communication messages through a wireless communication system coupled to an antenna array; means for determining an area of interest for transmitting the vehicular communication messages; and means for controlling a radiation pattern of the antenna array to direct wireless energy toward the area of interest.

Example 32 includes the apparatus of example 31. In this example, the apparatus is deployed in a vehicle and the means for determining the area of interest determines the area of interest based on objects detected in a vehicle's surrounding environment.

Example 33 includes the apparatus of any one of examples 31 to 32. In this example, the means for determining the area of interest determines the area of interest based on position information received from a vehicle through the wireless communication system.

Example 34 includes the apparatus of any one of examples 31 to 33. In this example, the means for determining the area of interest determines the area of interest based on a comparison of a geographical position with a roadway configuration identified from map data.

Example 35 includes the apparatus of any one of examples 31 to 34. In this example, the apparatus includes means for identifying an interference source, wherein the means for controlling the radiation pattern directs wireless energy away from the interference source.

Example 36 includes the apparatus of any one of examples 31 to 35. In this example, the apparatus is deployed in a vehicle, and wherein the means for controlling the radiation pattern increases a directivity of the antenna array when the vehicle is traveling on a bidirectional roadway.

Example 37 includes the apparatus of any one of examples 31 to 36. In this example, the apparatus is deployed in a first vehicle, and the means for controlling the radiation pattern adjusts a beam angle of the antenna array to direct the wireless energy to a second vehicle as a relative position between the first vehicle and the second vehicle changes.

Example 38 includes the apparatus of any one of examples 31 to 37. In this example, the apparatus is deployed in a roadside unit.

Example 39 includes the apparatus of any one of examples 31 to 38. In this example, the means for determining the area of interest determines the area of interest is based on a predicted position of a vehicle, wherein the predicted position is based on location, speed, and direction information received from the vehicle.

Example 40 includes the apparatus of any one of examples 31 to 39. In this example, the means for transmitting vehicular communication messages is a Dedicated Short-Range Communications (DSRC) system.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for wireless communications comprising:
    a wireless communication system;
    an antenna array coupled to the wireless communication system;
    a processor configured to run a wireless communication application, wherein the wireless communication application is configured to determine an area of interest based on a comparison of a geographical position of the apparatus with a roadway configuration identified from road map data; and
    a pattern controller to adjust a radiation pattern of the antenna array to direct wireless energy toward the area of interest,
    wherein the apparatus is deployed in a vehicle and wherein to adjust the radiation pattern of the antenna array comprises increasing a directivity of the antenna array via the vehicle traveling on a bidirectional roadway and decreasing the directivity of the antenna array when the vehicle is traveling on a single-direction roadway.

2. The apparatus of claim 1, wherein the area of interest is determined based, based at least in part, on objects detected in the vehicle's surrounding environment.

3. The apparatus of claim 1, wherein the area of interest is determined based, at least in part, on position information comprising map coordinates transmitted from a second vehicle and received through the wireless communication system.

4. The apparatus of claim 1, wherein the roadway configuration describes a path of the roadway identified from the road map data.

5. The apparatus of claim 1, wherein the wireless communication application is configured to identify an interference source and instruct the pattern controller to adjust the radiation pattern of the antenna array to direct wireless energy away from the interference source.

6. The apparatus of claim 1, wherein the vehicle is a first vehicle and wherein to adjust the radiation pattern of the antenna array comprises to adjust a beam angle of the antenna array to direct the wireless energy to a second vehicle as a relative position between the first vehicle and the second vehicle changes.

7. The apparatus of claim 1, wherein the area of interest is based on a predicted position of a second vehicle, wherein the predicted position is based, at least in part, on location, speed, and direction information received from the second vehicle.

8. The apparatus of claim 1, wherein the wireless communication system is a Dedicated Short-Range Communications (DSRC) system.

9. A non-transitory, computer-readable medium comprising instructions that are executable by a processor to direct the processor to:

transmit wireless communication messages through a wireless communication system coupled to an antenna array;

determine an area of interest for transmitting the wireless communication messages based on a comparison of a geographical position of the antenna array with a roadway configuration identified from road map data; and control a radiation pattern of the antenna array to direct wireless energy toward the area of interest, wherein the computer-readable medium is deployed in a vehicle and wherein to control the radiation pattern of the antenna array comprises increasing a directivity of the antenna array via the vehicle traveling on a bidirectional roadway and decreasing the directivity of the antenna array when the vehicle is traveling on a single-direction roadway.

10. The computer-readable medium of claim 9, wherein the area of interest is determined based, at least in part, on objects detected in the vehicle's surrounding environment.

11. The computer-readable medium of claim 9, wherein the area of interest is determined based, at least in part, on position information comprising map coordinates transmitted from a second vehicle and received through the wireless communication system.

12. The computer-readable medium of claim 9, wherein the roadway configuration describes a path of the roadway identified from the road map data.

13. The computer-readable medium of claim 9, comprising instructions to identify an interference source and control the radiation pattern of the antenna array to direct wireless energy away from the interference source.

14. The computer-readable medium of claim 9, wherein the vehicle is a first vehicle and wherein to adjust the radiation pattern of the antenna array comprises to adjust a beam angle of the antenna array to direct the wireless energy to a second vehicle as a relative position between the first vehicle and the second vehicle changes.

15. The computer-readable medium of claim 9, wherein the area of interest is based on a predicted position of a second vehicle, wherein the predicted position is based, at least in part, on location, speed, and direction information received from the second vehicle.

16. The computer-readable medium of claim 9, wherein the wireless communication system is a Dedicated Short-Range Communications (DSRC) system.

17. A method of performing wireless communications, comprising transmitting wireless communication messages through a wireless communication system coupled to an antenna array deployed in a vehicle;

determining an area of interest for transmitting the wireless communication messages based on a comparison of a geographical position of the antenna array with a roadway configuration identified from road map data; and controlling a radiation pattern of the antenna array to direct wireless energy toward the area of interest, wherein the controlling the radiation pattern of the antenna array comprises increasing a directivity of the antenna array via the vehicle traveling on a bidirectional roadway and decreasing the directivity of the antenna array when the vehicle is traveling on a single-direction roadway.

18. The method of claim 17, wherein determining the area of interest is based, at least in part, on objects detected in a vehicle's surrounding environment.

19. The method of claim 17, wherein determining the area of interest is based, at least in part, on position information comprising map coordinates transmitted from a seconed vehicle and received through the wireless communication system.

20. The method of claim 17, wherein the roadway configuration describes a path of the roadway identified from the road map data.

21. The method of claim 17, comprising identifying an interference source and controlling the radiation pattern of the antenna array to direct wireless energy away from the interference source.

* * * * *